United States Patent [19]

Mizoguchi

[11] Patent Number: 4,727,437
[45] Date of Patent: Feb. 23, 1988

[54] RECORDING APPARATUS WITH RECORDING MEDIUM LENGTH SENSORS

[75] Inventor: Yoshiyuki Mizoguchi, Yokohama, Japan

[73] Assignee: Canon Kabushiki Kaisha, Tokyo, Japan

[21] Appl. No.: 947,823

[22] Filed: Dec. 30, 1986

[30] Foreign Application Priority Data

Jan. 9, 1986 [JP] Japan ................................. 61-1426

[51] Int. Cl.⁴ .................... H04N 1/21; H04N 1/23; G01D 15/24; B41J 29/18
[52] U.S. Cl. .................................. 358/304; 346/136; 400/708; 83/289
[58] Field of Search ............... 346/136, 76 PH, 76 R; 358/296, 304; 83/289, 364, 365, 370; 271/258, 259; 400/621, 621.2, 708

[56] References Cited

U.S. PATENT DOCUMENTS

| | | | |
|---|---|---|---|
| 4,326,815 | 4/1982 | Kapp | 271/4 X |
| 4,527,172 | 7/1985 | Nagashima et al. | 346/145 X |
| 4,560,990 | 12/1985 | Sue et al. | 346/136 X |
| 4,636,787 | 1/1987 | Kishi | 346/136 X |
| 4,667,208 | 5/1987 | Shiraki et al. | 346/136 X |

FOREIGN PATENT DOCUMENTS 57-47685  3/1982  Japan.

Primary Examiner—E. A. Goldberg
Assistant Examiner—Patrick W. Foster
Attorney, Agent, or Firm—Fitzpatrick, Cella, Harper & Scinto

[57] ABSTRACT

A recording apparatus includes recording means for recording information on a continuous recording medium at a recording position; means for supplying the recording medium to the recording position and delivering it from the recording position; first detecting means, arranged at a delivery side of the recording medium with respect to the recording position, for detecting the presence/absence of the recording medium; and second detecting means, arranged at a feed side of the recording medium with respect to the recording position, for detecting the presence/absence of the recording medium. The second detecting means is spaced apart from the recording position by a distance longer than a length of one page of an image to be recorded.

10 Claims, 5 Drawing Figures

RECORDING APPARATUS WITH RECORDING MEDIUM LENGTH SENSORS

BACKGROUND OF THE INVENTION

1. Field of the Invention

The present invention relates to a recording apparatus and, more particularly, to a recording apparatus using a continuous recording medium.

2. Related Background Art

In a variety of conventional recording apparatus, the presence/absence of a recording medium (to be referred to as recording paper hereinafter) is detected prior to recording, and then recording is performed.

Conventional recording paper detecting means are arranged as shown in FIGS. 4 and 5, respectively.

In the detecting means of FIG. 4, recording paper 3 wound around a platen 1 is guided between a recording head 2 and the platen 1. A sensor 4 is located at a scanning position (to be referred to as a recording position hereinafter) of the recording head 2 to detect the presence/absence of the recording paper 3.

With the above arrangement, recording is initiated after the sensor 4 detects at least the leading end of the recording paper 3.

Since the recording head 2 and the sensor 4 are located at the recording position in the recording paper detecting means of this type, various control sequences such as control for setting the leading end of the recording paper 3 to be separated by a predetermined distance from the recording start position can be performed easily.

The detecting means of FIG. 5 is employed when a sensor 4 cannot be located at the recording position, e.g., when no space is assured to locate the sensor at the recording position. One sensor 5 is located at the delivery side of a recording position A, and the other sensor 6 is located at the feed side of the recording position A.

With the above arrangement, recording is initiated only when the two sensors 5 and 6 simultaneously detect the presence of recording paper. When the arrangements in FIGS. 4 and 5 are employed, problems are not incurred in an apparatus for recording an image having a predetermined length, e.g., an apparatus using paper sheets to record images within the area of the paper sheet. In this case, if the recording start position is controlled appropriately, paper is not used up during image recording. However, if continuous recording paper such as a roll of paper or fan fold paper is used, recording paper may be used up even during image recording, resulting in inconvenience.

SUMMARY OF THE INVENTION

It is an object of the present invention to prevent a recording medium from being used up during recording in a recording apparatus using a continuous recording medium.

It is another object of the present invention to allow accurate recording operation.

The above and other objects, features and advantages of the present invention will be apparent from the following detailed description.

BRIEF DESCRIPTION OF THE DRAWINGS

FIGS. 1 to 3 show an embodiment of the present invention, in which FIG. 1 is a schematic view showing a recording apparatus, FIG. 2 is a block diagram of the apparatus, and FIG. 3 is a flow chart for explaining control operation of the apparatus.

DETAILED DESCRIPTION OF THE PREFERRED EMBODIMENT

Figure 1:
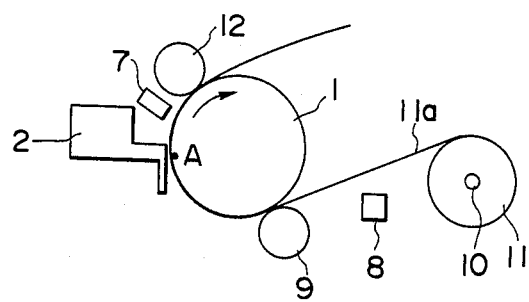

FIG. 1 shows a mechanical structure of a recording apparatus. A platen roller 1 extends along a direction perpendicular to the surface of FIG. 1 and is driven by a platen motor 18 (to be described later). A pinch roller 9 urges continuous paper 11a against the platen roller 1. The paper 11a is fed from a rolled paper source 11 rotatable about a shaft 10. A recording head 2 includes an ink-jet nozzle and is guided by a guide (not shown). The recording head 2 can be reciprocated along the directions perpendicular to the surface of FIG. 1.

A pinch roller 12 urges the recording paper 11a against the platen roller 1. With the above, the platen roller 1 and the pinch rollers 9 and 12 constitute means for feeding the recording paper 11a to a recording position A and delivering it from the recording position A.

The pinch roller 9 is located at the side of paper source 11, i.e., the side of paper feed or advance, with respect to the recording position A. The pinch roller 12 is located at a position farther away than the recording position A is from the recording head 2, i.e., at the delivery side.

Sensors 7 and 8 comprise photosensors for detecting the presence of the recording paper 11a. The sensor 8 is located at the feed side of the recording paper and is spaced apart from the recording position A by a length larger than at least a length of one page of an image to be recorded. The distance between the sensor 8 and the recording position A is longer than that between the pinch roller 9 and the recording position A.

The sensor 7 is located at the delivery side of the recording paper between the pinch roller 12 and the recording position A. Therefore, a distance between the sensor 7 and the recording position A is shorter than that between the sensor 8 and the recording position A.

In this embodiment, the sensor 7 is located at a position spaced apart from the recording position A by a predetermined distance at the side of paper delivery, and the sensor 8 is located at a position spaced apart from the recording position by a distance larger than a length of one page of an image to be recorded.

With the above structure, when the sensor 7 and 8 are simultaneously ON, the recording paper having a length larger than that of one page of an image to be recorded present between the sensors 7 and 8. Therefore, the recording paper is not used up during the recording operation.

Figure 2:
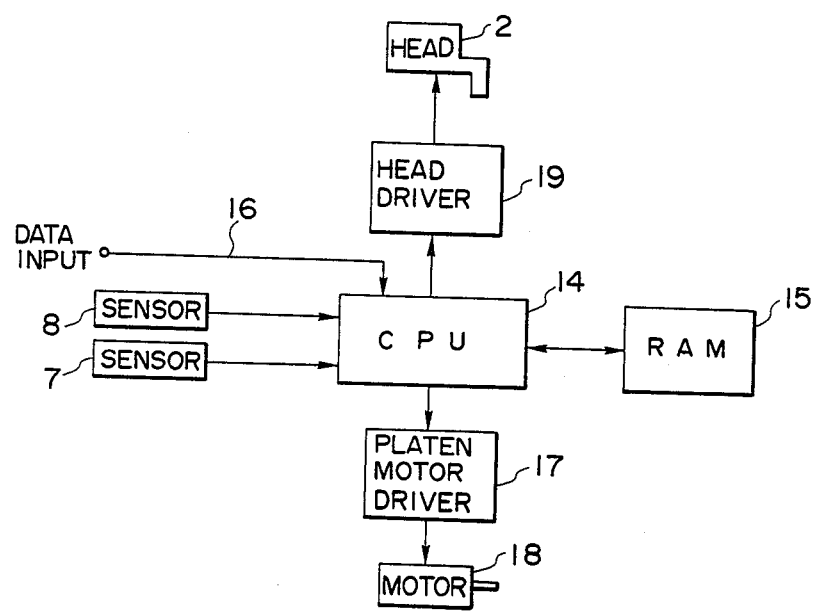

FIG. 2 is a block diagram of the recording apparatus of this embodiment. All operations of the recording apparatus are controlled by a central processing unit (to be referred to as a CPU hereinafter) 14. A memory 15 comprises a RAM. The RAM 15 stores image data input from a keyboard (not shown) and an external host computer (not shown) through an input line 16. Various flag and counter areas required for controlling the recording apparatus are allocated in the RAM 15.

The CPU 14 retrieves the detection results from the sensors 7 and 8, controls rotation of the platen roller 1 through a platen motor driver 17 and a motor 18, and drives the recording head 2 through a head driver 19 so as to record each image (a page image) stored in the RAM 15.

Figure 3:
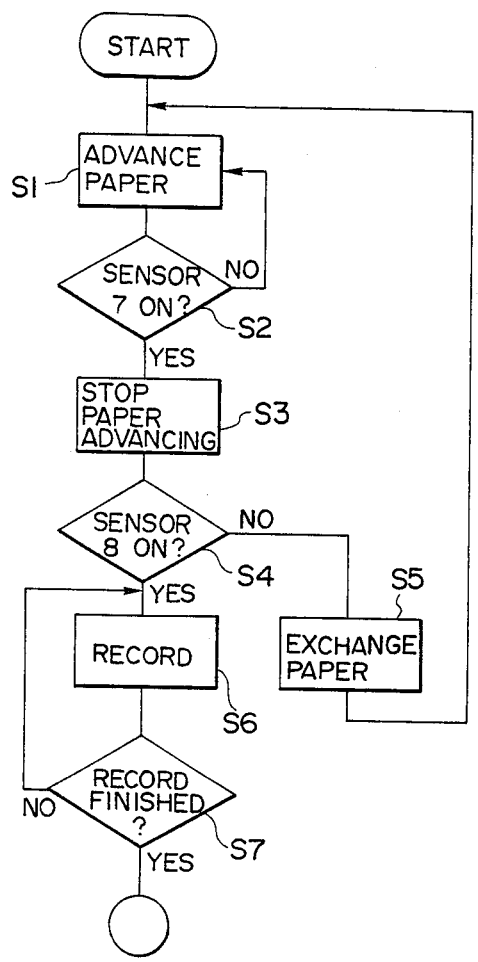
Figure 4:
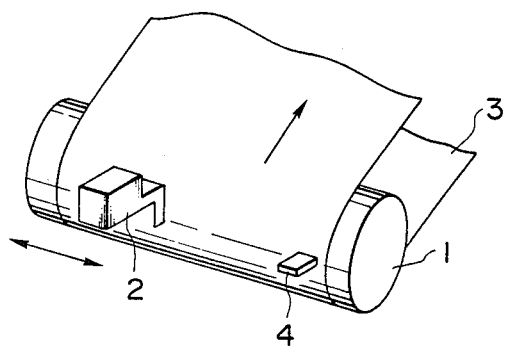
FIGS. 4 and 5 are respectively a perspective view and a side view of conventional recording apparatuses for explaining different constructions.
Figure 5:
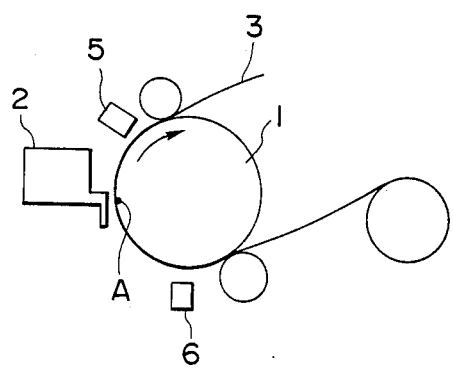

The operation of the recording apparatus having the arrangement described above, will be described with reference to a flow chart shown in FIG. 3. It should be noted that the contents of the flow chart are stored in the CPU 14.

When a recording instruction is generated, the recording paper 11a is slightly advanced or fed in step S1. When the sensor 7 detects the absence of paper, the flow returns to step S1 and paper is fed again. When the sensor 7 detects the presence of paper, then paper feeding is interrupted (steps S2 and S3).

After the sensor 7 detects the presence of paper, the CPU 14 determines the detection state of the sensor 8 (step S4). If the CPU 14 determines that the sensor 8 has detected the presence of paper (step S4), the recording head 2 is scanned, and the platen roller 1 is rotated by one revolution to perform image recording. Recording continues until all pieces of one-page image data stored in the RAM 15 are recorded on the recording paper (steps S6 and S7).

However, if the CPU 14 determines in step S4 that the sensor 8 has detected the absence of paper, the flow advances to step S5 to replace the current paper source 11 with a new one. The flow then returns to step S1.

Since the recording apparatus of this embodiment is arranged in the manner described above, the recording sheet is not used up during recording, thus eliminating the inconvenience posed by the conventional recording apparatus. Furthermore, recording errors can be completely eliminated using two sensors 7 and 8 to detect the position of the recording paper.

I claim:

1. A recording apparatus including:
   recording means for recording information on a continuous recording medium at a recording position;
   means for supplying said continuous recording medium to the recording position and delivering said continuous recording medium from the recording position;
   first detecting means, arranged at a delivery side of said continuous recording medium with respect to the recording position, for detecting the presence/absence of said continuous recording medium; and
   second detecting means, arranged at a feed side of said continuous recording medium with respect to the recording position, for detecting the presence/absence of said continuous recording medium, said second detecting means being spaced apart from the recording position by a distance longer than a length of one page of an image to be recorded.

2. An apparatus according to claim 1, wherein said recording means starts recording said one page of the image and executes recording of said one page when said second detecting means detects the presence of said continuous recording medium.

3. An apparatus according to claim 1, wherein said first detecting means is located nearer than said second detecting means is to the recording position.

4. An apparatus according to claim 1, wherein said recording means starts recording of a new page of an image when said first and second detecting means detect the presence of said continuous recording medium.

5. An apparatus according to claim 1, wherein said feeding/delivering means comprises a plate roller located opposite said recording means, first urging member located at the delivery side of said continuous recording medium with respect to the recording position and urges against said platen roller, and a second urging member located at the feed side of said continuous recording medium with respect to the recording position and urged against said platen roller, said first detecting means being located between said first urging member and the recording position, and said second detecting means being located farther away than said second urging member is from the recording position.

6. A recording apparatus including:
   recording means for recording information on a continuous recording medium at a recording position;
   means for feeding said continuous recording medium to the recording position and delivering said continuous recording medium for the recording position;
   detecting means, located at a feed side of said continuous recording medium with respect to the recording position, for detecting the presence/absence of said continuous recording medium, said detecting means being spaced apart from the recording position by a distance longer than one of page of an image to be recorded; and
   control means for controlling to cause said recording means to perform recording on the basis of a detection result from said detecting means, said control means being adapted to cause said recording means to continue recording upon detection of the absence of said continuous recording medium by said detecting means after recording of said one page of the image is started.

7. An apparatus according to claim 6, further including another detecting means, located at the delivery side of said recording medium with respect to the recording position, for detecting the presence/absence of the continuous recording medium.

8. An apparatus according to claim 7, wherein said control means allows recording of a new page of an image only when said detecting means and said another detecting means simultaneously detect the presence of the continuous recording medium.

9. An apparatus according to claim 7, wherein said control means inhibits recording of a new page of an image when said another detecting means detects the absence of said continuous recording medium.

10. An apparatus according to claim 6, wherein said control means inhibits recording of a new page of an image when said detecting means detects the absence of said continuous recording medium.

* * * * *

UNITED STATES PATENT AND TRADEMARK OFFICE
CERTIFICATE OF CORRECTION

PATENT NO. : 4,727,437
DATED : February 23, 1988
INVENTOR(S) : YOSHIYUKI MIZOGUCHI It is certified that error appears in the above-identified patent and that said Letters Patent is hereby corrected as shown below:

<u>COLUMN 2</u>

Line 49, "sensor" should read --sensors--.

<u>COLUMN 4</u>

Line 9, "plate" should read --platen--.
Line 26, "for" should read --from--.
Line 32, "one of" should read --one--.

Signed and Sealed this

Ninth Day of August, 1988

*Attest:*

DONALD J. QUIGG

*Attesting Officer*  *Commissioner of Patents and Trademarks*